Sept. 22, 1931. H. W. KLEIST 1,824,158
REFRIGERATING APPARATUS
Filed Dec. 28, 1929 2 Sheets-Sheet 1
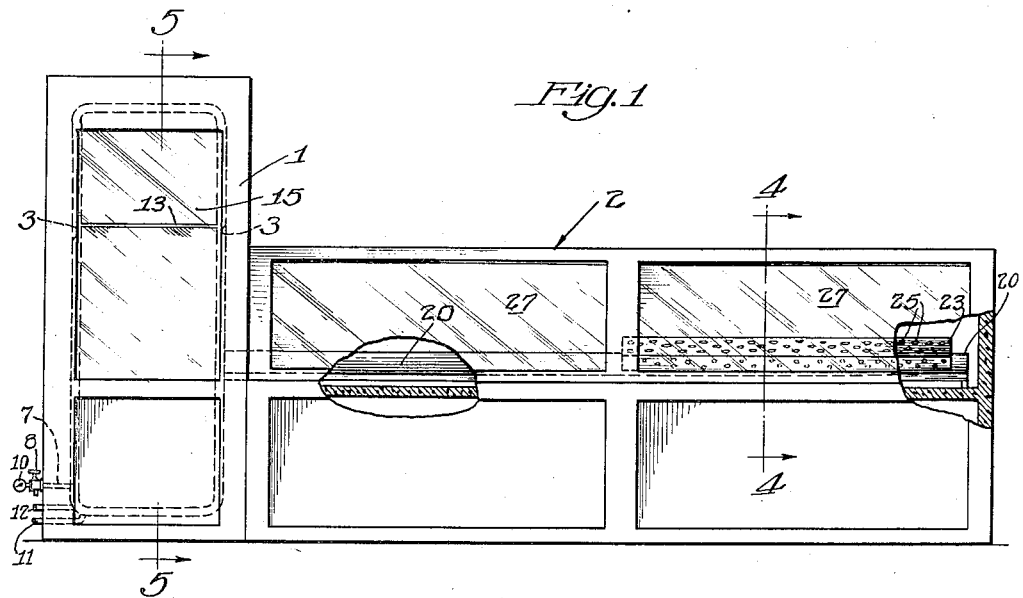
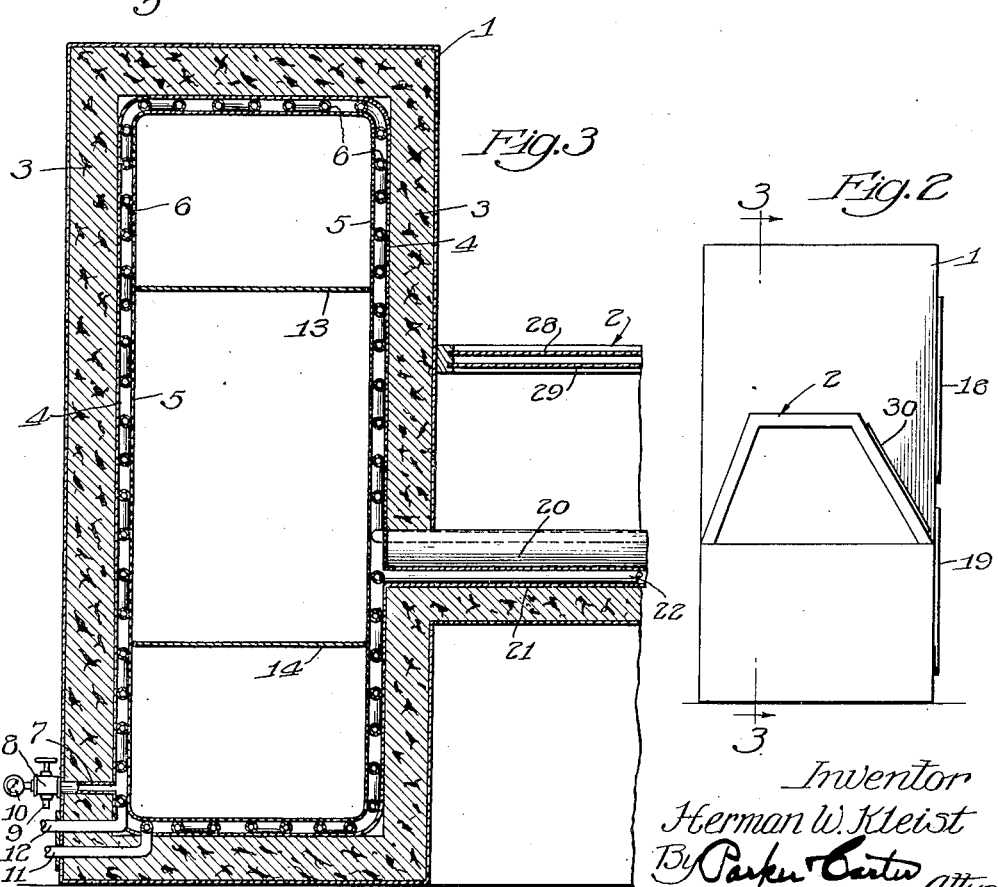
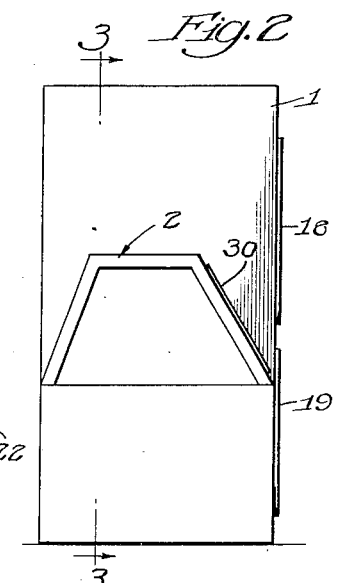
Inventor
Herman W. Kleist
By Parker Carter
Attys Sept. 22, 1931. H. W. KLEIST 1,824,158
REFRIGERATING APPARATUS
Filed Dec. 28, 1929 2 Sheets-Sheet 2
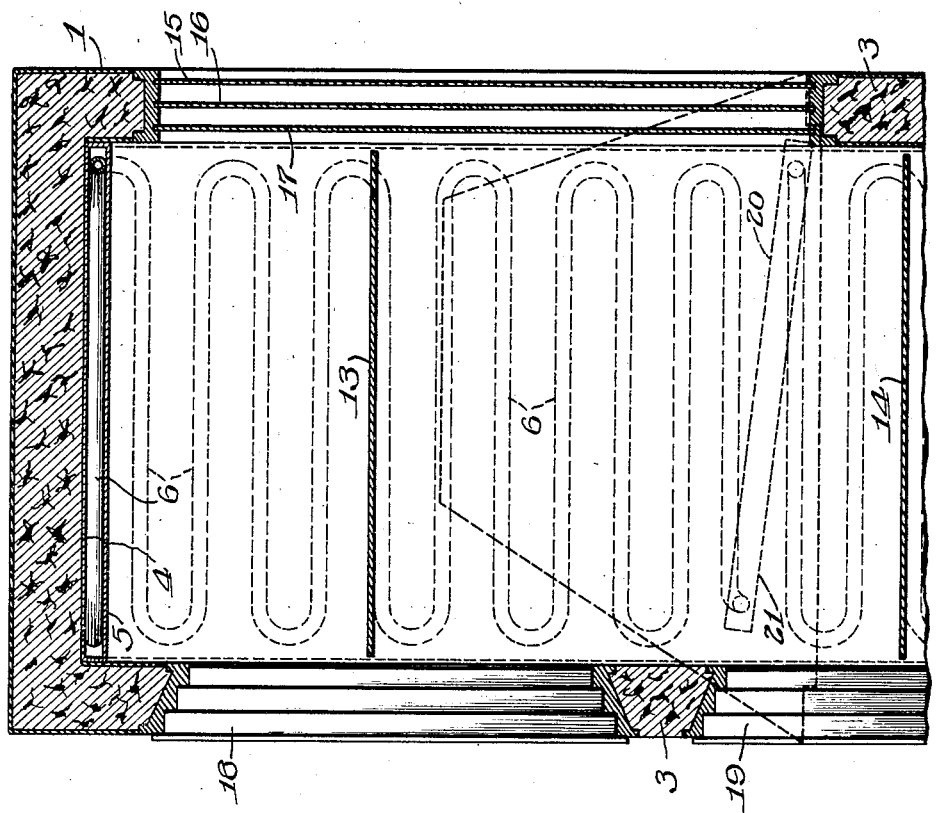
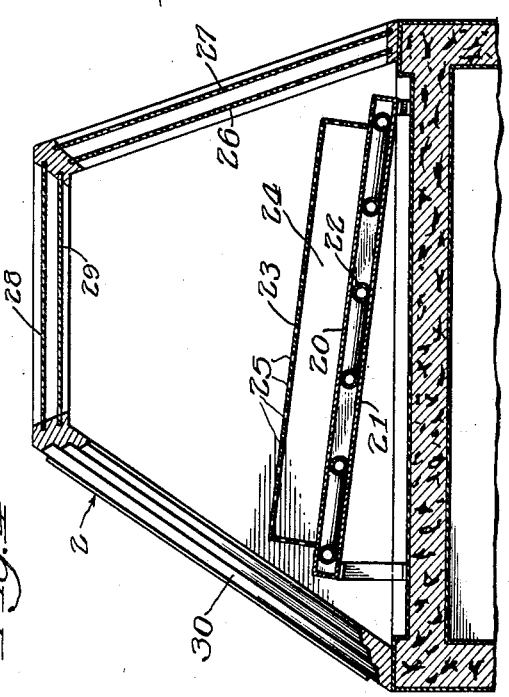
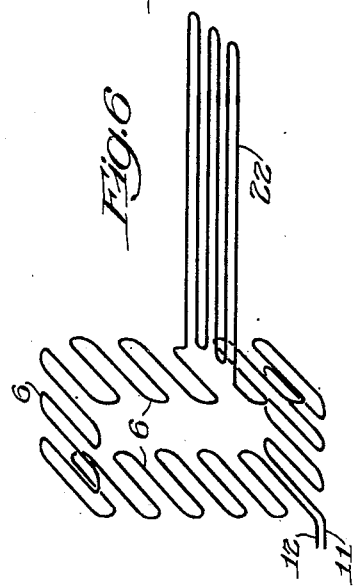
Inventor
Herman W. Kleist
By Parker & Carter Attys.

Patented Sept. 22, 1931

1,824,158

UNITED STATES PATENT OFFICE

HERMAN W. KLEIST, OF CHICAGO, ILLINOIS, ASSIGNOR TO DOLE REFRIGERATING AND MACHINE COMPANY, OF CHICAGO, ILLINOIS, A CORPORATION OF ILLINOIS

REFRIGERATING APPARATUS

Application filed December 28, 1929. Serial No. 417,211.

This invention relates to refrigerating apparatus and has for its object to provide a new and improved apparatus of this description.

An important improvement in the distribution of food products has been made which consists in taking perishable food products such as meat, fish, fruits, vegetables and the like and freezing them at the packing plant. This avoids the waste and spoilage heretofore not avoidable and greatly reduces the cost of foods to the general public. The meat, for example may be cut up into the proper sizes for the consumer. These frozen products are then delivered in a frozen condition to the retailer and he sells then in this frozen condition to the consumer. It becomes of vital importance for the retailer to be able to keep these products in a frozen condition for if the temperature is reduced so that they cease to be frozen, great injury and loss accrues unless they are at once used.

It is, therefore, necessary that the retailer be provided with a means for displaying the foods which are maintained then in the frozen condition until they are delivered to the purchaser and such apparatus must be not only effective but of a low cost.

One of the objects of the present invention is to provide such a refrigerating apparatus.

The invention has other objects which are more particularly pointed out in the accompanying description.

Referring now to the drawings, Fig. 1 is a view showing one form of refrigerating apparatus embodying the invention.

Fig. 2 is an end view of the device shown in Fig. 1.

Fig. 3 is an enlarged, vertical, sectional view through the device of Fig. 1 with parts broken away.

Fig. 4 is an enlarged sectional view taken on line 4—4 of Fig. 1.

Fig. 5 is an enlarged sectional view taken on line 5—5 of Fig. 1 with parts broken away.

Fig. 6 is a diagrammatic view showing the pipe containing the refrigerant.

Like numerals refer to like parts throughout the several figures. Referring now to the drawings:

I have shown in Fig. 1 a refrigerator 1 arranged to maintain a temperature which will keep the food in a frozen condition. Associated with the refrigerator 1 is a display device 2 in which the food may be displayed to prospective purchasers. This display device is also arranged to keep the food in a frozen condition. Means are also provided so that foods which should not be frozen but simply kept cool may also be displayed in the display device.

The refrigerator 1 is provided with any suitable insulating wall 3. Within this wall is provided a container for the pipe through which the refrigerant is circulated. This container consists of the metal walls 4 and 5 separated by a space in which is received the pipe 6 through which the refrigerant is circulated. Some means is provided for eliminating the moisture in the pipe container so that it cannot be deposited in a frozen condition on the pipe. If the moisture in the air can be deposited on the pipe, it will freeze thereon and provide a coating which greatly reduces the efficiency of the refrigerant and makes it necessary to defrost the pipe by taking out the refrigerant and running a warm fluid therethrough.

It will, therefore, be seen that by the use of a pipe for the refrigerant upon which moisture deposits and is frozen, it is impossible to keep the food material in the refrigerator in a frozen condition. By means of my device, I prevent the deposit and freezing of moisture on the pipes, thus requiring no defrosting and permitting the refrigerant to be used in the pipes continuously at its maximum efficiency. I prevent this moisture from depositing on the pipes by exhausting the air from the pipe container, the pipe container being sealed air tight so as to hold a vacuum in the container.

The air may be exhausted from the pipe container by means of the air pipe 7 provided with a valve 8 which may be connected by the end 9 with an air pump or other air exhausting device. I prefer to provide a gauge 10 for indicating the amount of vacuum. The pipe for the refrigerant is coiled in the pipe container and the ends 11 and 12 pass through the wall of the refrigerator and to a suitable source of refrigerant supply which may be supplied from any suitable source not being shown herein.

The refrigerator may be provided with suitable shelves 13, and 14 for the frozen food. The refrigerator is preferably arranged so that the food therein can be seen by the customer. For this purpose the front of the refrigerator is provided with a series of glass walls 15, 16, and 17 which are separated by air spaces so that the proper low temperature may be easily maintained. The refrigerator is provided at the back with the doors 18 and 19. The display device is also provided with a pipe container which consists of the metal walls 20, 21 between which the pipe 22 is coiled through which the refrigerant is circulated. This pipe container is also hermetically sealed and the air withdrawn therefrom to prevent moisture from depositing on the pipes. The pipe container in the display device may be connected up with the pipe container in the refrigerator, as shown in Fig. 3 so that the air may be withdrawn therefrom by the same apparatus which withdraws the air from the pipe container in the refrigerator.

When this is the case, the pipe 22 may be continuous with the pipe 6, as shown in Fig. 6. It is, of course evident that the pipe container of the display device may be separate from that of the refrigerator if desired.

When the air is exhausted from the pipe container, the pressure of the exterior air causes the metal walls of the pipe container to be tightly pressed against the pipe containing the refrigerant, thereby assuring an efficient cooling effect in the refrigerator and the display device. In the display device the articles which are to be held in a frozen condition may be placed directly upon the metal wall 20 of the pipe container (See Fig. 4). When it is desired to display food that is not to be frozen, in the display device, I provide a food support 23 above the wall 20 of the pipe container and which is separated therefrom by an air space 24. This food support preferably only covers a part of the wall 20, as shown in Fig. 1 so as not to hide the frozen food which must be in direct contact therewith in order to be kept in a frozen condition.

This food support is preferably provided with perforations 25 and is preferably open at the ends so that the cold air in contact with the wall 20 may be circulated throughout the entire interior of the display device. This display device is preferably provided with glass or transparent walls 26, 27, 28, and 29 separated by air spaces so that the food may be easily seen but the desired low temperature may be maintained. The display device is also provided at the rear with one or more doors 30 by means of which access thereto is obtained.

It will thus be seen that I have provided here a cheap and efficient refrigerating apparatus which will be within the reach of the ordinary food retailer and by means of which the frozen foods may be maintained in a frozen condition until sold to the consumer and displayed while in this frozen condition, and wherein foods that are not to be frozen may be simultaneously displayed.

I claim:—

1. A refrigerating apparatus comprising a refrigerator, means for maintaining a freezing temperature in said refrigerator continuously so that the food therein may remain in a frozen condition, and an elongated laterally extending display device associated with said refrigerator, said display device being provided with means for maintaining food in a frozen condition while being displayed the individual cooling means being surrounded by a vacuum.

2. A refrigerating apparatus comprising a refrigerator, means for maintaining a freezing temperature in said refrigerator continuously so that the food therein may remain in a frozen condition, and an elongated laterally extending display device at one side of said latter means and said refrigerator, said display device being provided with means for maintaining food in a frozen condition while being displayed, and means associated with said display device for also simultaneously displaying foods which must be kept above freezing temperature both cooling means being surrounded by a common vacuum.

3. A refrigerating apparatus comprising a display device provided with a flat pipe container consisting of separated metal walls with a space between them hermetically sealed, a pipe in said space containing the refrigerant, means for preventing moisture from depositing on said pipe, the pipe container arranged so that food may be placed directly in contact therewith and maintained in a freezing condition, a food support located above said pipe container near one end of the pipe container and separated therefrom by an air space for receiving food which must be kept above freezing temperature.

4. A refrigerating apparatus comprising a main portion having a cooling storage chamber, a flat pipe container located in said cooling storage chamber, an elongated display chamber extending laterally from the cooling storage chamber, a flat pipe container therein, the latter flat pipe container connected with the flat pipe container in the storage chamber.

5. A refrigerating apparatus comprising a storage compartment, an elongated display compartment extending laterally therefrom, each having a cooling space, the two cooling spaces being entirely separate so that the temperature of one is not affected by the temperature of the other, a cooling coil in each compartment and a connection between the cooling coil in the storage compartment and the cooling coil in the display compartment both cooling coils being surrounded by a common vacuum.

6. A refrigerating apparatus comprising a storage compartment, a display compartment extending laterally from said storage compartment each of said compartments being provided with a pipe container consisting of outer and inner flexible walls with a space between them, the space being hermetically sealed, a coil of pipe between said walls through which the refrigerant passes the air in the space between said walls, being substantially exhausted to cause the walls to be pressed into close contact with said pipe, the coil in the display compartment being connected with the coil in the storage compartment, the walls in the display compartment being connected with the walls of the storage compartment so that the space between the walls in the display compartment is in communication with the space between the walls in the storage compartment.

7. An apparatus for cooling compartments comprising separated walls of conducting material, a pipe cooling coil located between said walls and in close contact with said separated walls and adapted to contain the refrigerant, the space between the walls containing the coil being hermetically sealed, the air in said space being substantially exhausted so as to form a vacuum.

8. An apparatus for cooling compartments comprising separated walls of conducting material, a pipe cooling coil located between said walls and in close contact with said separated walls and adapted to contain the refrigerant, the space between the walls containing the coil being hermetically sealed, a valve controlled pipe leading from said space through which air is exhausted to form a vacuum in the space, and an inlet and outlet for said coil, the air in said space being substantially exhausted so as to form a vacuum.

9. An apparatus for cooling compartments comprising a coil container consisting of outer and inner flexible walls with a space between them, the inner wall enclosing a cooling space into which the material to be cooled is placed, a coil in the space between the walls adapted to be connected with a source of refrigerant supply, said space being hermetically sealed, and means for tightly pressing said walls into contact with said coils which consists in withdrawing air from said space to form a vacuum around said coil.

10. An apparatus for cooling compartments comprising a coil container consisting of outer and inner walls with a space between them, the inner wall facing a cooling space into which the material to be cooled is placed, a coil in the space between the walls, means for connecting said coil with a source of refrigerant supply, said space being hermetically sealed, means for withdrawing air from said space to form a vacuum around said coil to cause the outer and inner walls to be forced tightly against said coil, and means for insulating the outer wall of said coil receptacle, the inner wall being free from insulation.

Signed at Chicago, county of Cook and State of Illinois, this 12th day of December, 1929.

HERMAN W. KLEIST.